(12) United States Patent
Weickert et al.

(10) Patent No.: US 6,499,296 B1
(45) Date of Patent: Dec. 31, 2002

(54) HYDRAULIC CIRCUIT

(75) Inventors: Thomas Weickert, Karsbach (DE); Erich Adlon, Wiesthal (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

(21) Appl. No.: 09/743,917

(22) PCT Filed: Jul. 9, 1999

(86) PCT No.: PCT/DE99/02131

§ 371 (c)(1),
(2), (4) Date: Feb. 15, 2001

(87) PCT Pub. No.: WO00/06915

PCT Pub. Date: Feb. 10, 2000

(30) Foreign Application Priority Data

Jul. 24, 1998 (DE) .......................................... 198 33 489

(51) Int. Cl.⁷ ............................................... F16D 31/02
(52) U.S. Cl. ........................................... 60/466; 60/468
(58) Field of Search .......................... 60/466, 468, 422

(56) References Cited

U.S. PATENT DOCUMENTS

| | | | |
|---|---|---|---|
| 5,018,935 A | 5/1991 | Gage | |
| 5,460,000 A | 10/1995 | Kropp | .......................... 60/422 |
| 5,636,516 A | * 6/1997 | Kon | .............................. 60/466 |
| 5,823,369 A | 10/1998 | Kuromoto | |

FOREIGN PATENT DOCUMENTS

| | | |
|---|---|---|
| DE | A1 31 46 508 | 6/1982 |
| DE | A1 34 31 969 | 3/1985 |
| DE | A1 38 31 172 | 3/1990 |
| DE | A1 39 34 641 | 4/1991 |
| DE | 42 20 656 A1 | 1/1993 |
| DE | 44 25 455 A1 | 1/1996 |
| DE | 19524900 A1 * | 1/1997 |
| DE | 195 24 900 A1 | 1/1997 |
| DE | A1 196 25 393 | 1/1998 |
| DE | A1 197 34 020 | 2/1999 |
| DE | 197 44 337 A1 | 4/1999 |
| EP | 0 053 323 A1 | 6/1982 |
| EP | 0 603 421 B1 | 7/1993 |
| EP | 0 672 797 A1 | 9/1995 |
| WO | WO 95/07231 | 3/1995 |

* cited by examiner

*Primary Examiner*—Edward K. Look
*Assistant Examiner*—Thomas E. Lazo
(74) *Attorney, Agent, or Firm*—Oliff & Berridge, PLC

(57) ABSTRACT

A hydraulic circuit for controlling a consumer of a mobile work tool, wherein the pressure in supply and outlet lines towards the consumer is limited by means of pilot-controlled pressure control valves. The pilot control stage of these pressure control valves may be adjusted in accordance with a pilot control pressure corresponding to the load of the work tool.

11 Claims, 4 Drawing Sheets

HYDRAULIC CIRCUIT

The invention relates to a hydraulic circuit for controlling a consumer and a method for controlling a hydraulic motor, wherein a like circuit is used.

Such circuits are employed in work tools wherein a positive or negative acceleration of an apparatus structure is to be accomplished in dependence on a pressure at the consumer. A typical application is, for example, the case of a rotating mechanism of a mobile excavator, the superstructure of which is moved through a rotating mechanism. The rotating mechanism is driven by means of a hydraulic motor supplied with pressure medium by a pump via a directional control valve.

In FIG. 1, which shall be referred to as early as now, a switching diagram for a like rotating mechanism drive is represented in a strongly simplified form. What is shown is a closed circuit, with the same principle being, of course, also applicable in the case of open circuits.

The closed circuit includes a hydrostatic pump 1 having the form of a variable displacement pump whereby a hydraulic motor 2 of the rotating mechanism is driven. Protection of the rotating mechanism drive is achieved with the aid of pressure control valves 4, 4' which open towards the outlet side (low-pressure side ND) when a predetermined system pressure is exceeded in the meter-in side (high-pressure side HD). In this case, the pressure medium is conveyed past the hydraulic motor 2 from the supply directly into the outlet, so that pressure peaks in the high-pressure branch may be avoided. Upon reversing the conveying direction of the hydrostatic pump 1, the HD and ND branches are exchanged, so that for securing this condition the parallel pressure control valve 4, 4' becomes effective.

Upon driving the hydraulic motor 1, the load pressure increases comparatively strongly because the stationary superstructure must initially be accelerated. Following the acceleration phase, i.e. after overcoming the start-up resistance, continued rotation of the superstructure may be achieved with comparatively lower forces, so that the load pressure drops to a lower level. When the super-structure is braked, a high pressure may correspondingly occur on the outlet side of the hydraulic motor. EP 0 603 421 A1 discloses an open circuit wherein fixedly set pressure control valves are used for limiting the various pressures to a maximum value. The pressure control valves may also be designed to be adjustable, so that a lower setting is predetermined through the force of a closing spring of the pressure control valve. This may be varied by a control pressure acting in the closing direction in addition to the force of the closing spring, so that an upper setting may be defined. Such a solution is disclosed in U.S. Pat. No. 5,460,000.

In EP 0 053 323 A1 a generic circuit is disclosed, wherein a control pressure acts in the opening direction of the pressure control valve, so that the adjustment of the outlet side pressure control valve may, for example, be diminished to a lower setting on a lower level.

In post-published patent application DE 19744337 to the same applicant, a pressure control valve is disclosed wherein the closing spring of a pilot control valve body is supported against a transformer piston which, in turn, may receive application of the pressure in the main stage of the pressure control valve for modification of the spring bias.

In practical use of the above described circuit variants it is found that upon decelerating a rotating mechanism, particularly where a low load or no load acts on the work equipment, abrupt stopping of the super-structure may occur. These abrupt loads may result in damage to the rotating mechanism or to the work equipment.

In contrast, the invention is based on the object of furnishing a hydraulic circuit for controlling a consumer and a method for controlling a hydraulic motor provided with a like circuit, wherein the operational safety of the work tool is improved while incurring minimum expense in terms of device technology.

This object is attained with respect to the hydraulic circuit and with respect to the method for controlling a hydraulic motor.

Owing to the measure of controlling the pilot controlled pressure control valve in the outlet or supply line, respectively, in dependence on a pilot load pressure reflecting the load, for example the mass moment of inertia of the work tool, the braking pressure controlled through the pressure control valve may be selected in accordance with this load.

I.e., in the case of a low load of the work tool, a correspondingly low braking pressure is adjusted, so that the work tool is decelerated with a comparatively low braking force. In cases of high loads, a correspondingly higher pressure is adjusted in the outlet line, so that the braking performance is always optimally adapted to the operating conditions.

In mobile work tools having a rotating mechanism drive it is an option to select control of the pressure control valves in dependence on the mass moment of inertia of the superstructure. The pilot load pressure corresponding to the mass moment of inertia may, for example, be tapped at the lifting cylinders located between the superstructure and the boom, so that a comparatively low expense in terms of circuit technology is required for realising the circuit according to the invention.

This load pressure e.g. corresponding to the moment of inertia of the superstructure is reported directly to a pilot control valve body of the pressure control valve or to a transformer piston, so that the closing force acting on the pilot control valve body is adjustable in accordance with the load of the work tool. Herein the minimum pilot load pressure is predetermined through the force of the closing spring, while the maximum pilot load pressure is determined by the force of the closing spring and by the detected load pressure.

In principle it is moreover conceivable to electrically perform control of the pressure control valve while electrically controlling the pressure control valve in accordance with the load pressure (moment of inertia).

The hydraulic circuit is preferably equipped with a shuttle valve having the pilot control line connected to its output, and at the inputs of which the load pressure of the first named consumer of the work tool and the load pressure corresponding to the load of the work tool of another consumer are reported.

In a preferred variant of the hydraulic circuit, the pilot load pressure acts on a transformer piston on which the closing spring for the pilot control valve body is supported.

As an alternative, the pilot control valve body may moreover receive direct application of the pilot load pressure.

It is particularly advantageous if the pressure control valves are designed as anti-cavitation valves.

The ratio of the diameters of the transformer piston and of the valve seat of the pilot control valve body preferably is 1.1:1.

Further advantageous forms of the invention are subject matters of the further appended claims. In the following, a preferred embodiment of the invention shall be explained in more detail by referring to schematic drawings, wherein:

Figure 2:
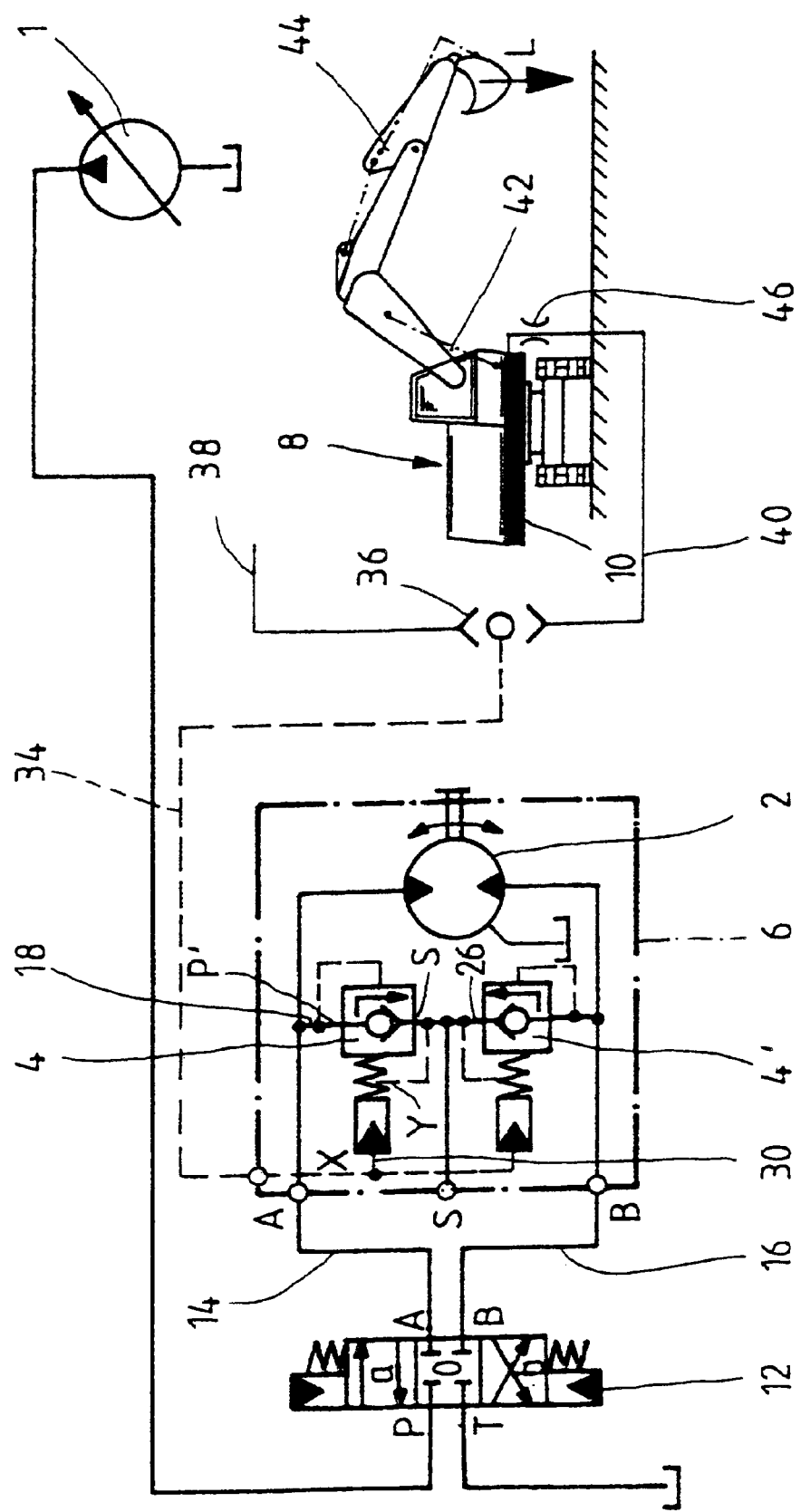
FIG. 2 is a switching diagram of a hydraulic circuit for controlling an excavator rotating mechanism.

FIG. 2 shows a strongly simplified switching diagram wherein a circuit 6 in accordance with the invention is employed for controlling a mobile work tool, for example the rotating mechanism 10 of an excavator 8. Needless to say, the circuit 6 is also applicable in other work tools, for example in loading/unloading equipment, tele-excavators and other work tools in which the above described acceleration and deceleration conditions may occur.

Figure 1:
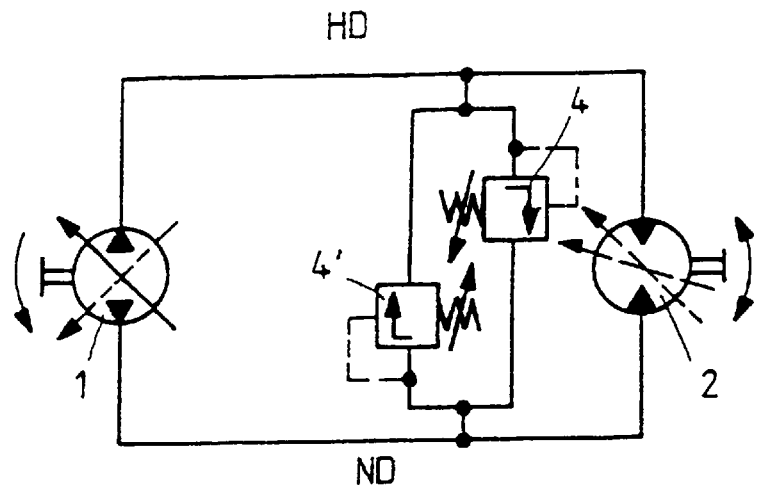
FIG. 1 is a simplified circuit diagram of a known rotating mechanism drive.

For the sake of simplicity, the same reference symbols as already attributed in connection with FIG. 1 shall hereinafter be used for corresponding components.

Driving the rotating mechanism 10 is achieved by means of a hydraulic motor 2 which is supplied with pressure medium via a hydrostatic pump 1 designed as a variable displacement pump. In the embodiment represented in FIG. 2, the system is designed as an open circuit wherein the pressure medium is sucked from a reservoir by the variable displacement pump 1 and returned to the reservoir by the hydraulic motor 2.

The hydraulic motor 2 is designed to have two directions of flow, wherein control is achieved through a directional valve 12 whereby the pressure medium is selectively applied to a port of the hydraulic motor 2 and returned to the reservoir T by the respective other port.

In the shown embodiment, the directional valve 12 is designed as a 4/3-directional control valve including a pump port P, a reservoir port T and two work ports A, B. In the spring-biased basic position, these four ports are blocked. Depending on control of the valve spool of the directional valve 12, it is then possible to connect pump port P to a work port A, B while the respective other work port is connected with the reservoir port.

Work lines 14, 16 lead from the two work ports A, B to the ports of the hydraulic motor 2. In order to secure the pressure in the work lines 14, 16, two pressure control valves 4, 4' having the form of anti-cavitation valves are provided through which the pressure medium may be discharged from a work line. In this way an excessive pressure build-up in the work lines and thus damage to the rotating mechanism drive may be prevented.

Figure 3:
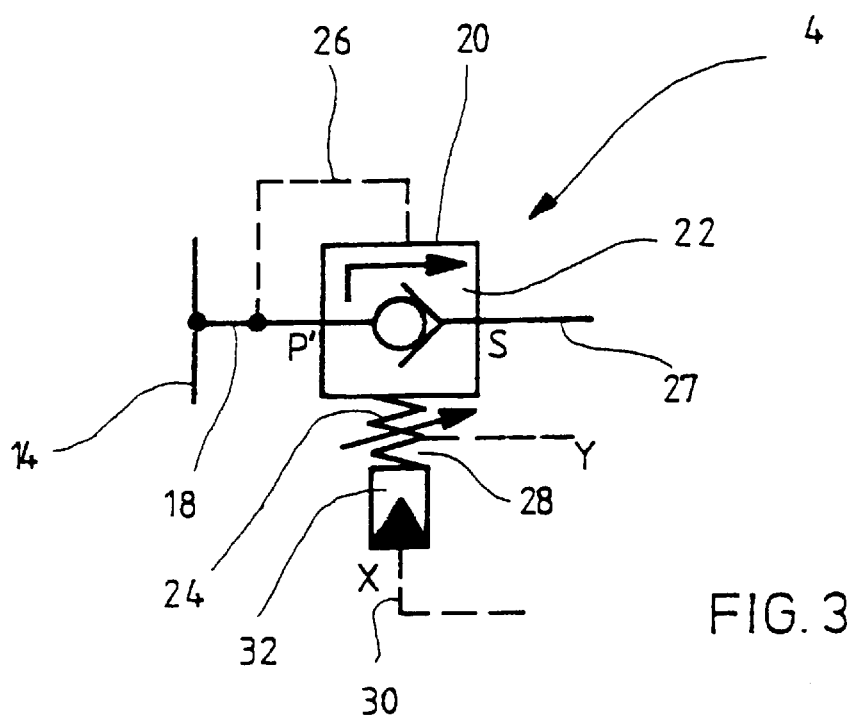
FIG. 3 is a switching symbol of a pressure control valve of the circuit in FIG. 2.

FIG. 3 shows the switching symbol of the pressure control valve 4 in enlarged representation. Accordingly, a pressure line 18 communicated with the input port P' of a main stage 20 of the pressure control valve 4 branches from the work line 14. A main piston 22 of the main stage 20 is biased into its closed position by a pressure spring 24. The pressure at input port P' of the main stage 20 is reported via a control line 26 to the front side acting in the opening direction of the main piston 22, so that upon exceeding a predetermined pressure in the work line 14, the input port P' is connected with the low-pressure, or reservoir port S. In order to enable the anti-cavitation function, the main stage 20 is designed such that flow in the opposite direction, i.e. from port S to port P' is possible. To the reservoir port S there is connected a connection line 27 through which the pressure medium is connected with the low-pressure region.

The set value of the main stage 20, i.e. the maximum pressure to which the pressure in the work line 14 is limited, may be adjusted through a pilot control stage 28 whereby the force acting on the main piston 22 in the closing direction may be varied. The basic principle may, of course, also be applied to pilot control stages wherein the pressure acting in an opening direction is variable, so that the maximum adjustable pressure is determined by the force of the pressure spring 24.

In the embodiment represented in FIG. 3, the pressure acting on the main piston 22 in the closing direction is controlled by means of a pilot control valve body described hereinafter, which is biased against a pilot control valve seat through a pilot control spring. This pilot control spring is supported against a transformer piston 32. At the back side of this transformer piston 32, an external control pressure is reported via a pilot control port X and a pilot control line 30, with the bias of the pilot control spring being adjustable as a result. The spring cavity of the pilot control spring is connected to the low-pressure region, e.g. the reservoir, via a control port Y, so that upon opening the pilot control valve body, pressure medium may flow off from the spring cavity of the main stage.

In a like construction, the lower setting of the pressure control valve is essentially predetermined by the force of the pilot control spring whereby the pilot control valve body is urged against the pilot control valve seat. By reporting the external control pressure to the pilot control port X, the forces acting in the closing direction may be increased, so that the maximum adjustable pressure is determined by the force of the pilot control spring and the control pressure reported to the pilot control port x.

In accordance with FIG. 2, the two identically constructed pressure control valves 4, 4' are arranged in parallel with the hydraulic motor 2, with the ports S of the pressure control valves 4, 4' being connected with each other through the connection line 26, while the input port P' is connected to the work lines 14 or 16, respectively, via the pressure line 18.

The two pilot control ports X are communicated via the pilot control line 30 with a common braking pressure reporting line 34 which is connected to the output port of a shuttle valve 36.

At an input port of the shuttle valve 36, the load pressure of the rotating mechanism, which may also be employed for controlling the variable displacement pump 1, is reported through a line 38. The other input port of the shuttle valve 36 is connected to the cylinder cavity of a lifting cylinder 42 for actuation of a boom 44 of the excavator 8 via a load reporting line 40. In other words, through the load reporting line 40 the pressure in the lifting cylinder 42 corresponding to the boom position is reported to the input port of the shuttle valve 36. This control pressure, which corresponds to the load of the excavator, varies with the position of the boom at a constant load L. I.e., when the boom 44 (load L constant) is retracted, the mass moment of inertia of the rotating mechanism will be comparatively low, so that upon adjusting the rotating mechanism, comparatively low forces need to be exerted, whereas when the boom is extended, the mass moment of inertia is substantially higher, so that higher forces will be required for accelerating or decelerating the rotating mechanism. Instead of the pressure in the lifting cylinder, other signal pressures may also be applied under practical circumstances for representing the load condition of the work tool. Thus it would, e.g., be possible to use a load ressure depending on the load L, a load pressure depending on the floor contact pressure of the work tool, etc., for controlling the pressure control valves 4, 4'.

The pressure in the load reporting line 40 may be restricted to a limit by means of a pressure control valve, so that for instance when the boom 44 is actuated against a stop, no excessive pressure build-up can occur in the work lines 14, 16. In order to reduce the influence of pressure fluctuations, a throttle 46 is provided in the load reporting line 40.

In order to rotate the rotating mechanism 10 in one direction, the directional valve 12 is taken from its basic position designated 0 into a switching position (for example a) by applying a control pressure. In this switching position, the pump port P is connected to the work line 14 via the work port A, so that the pressure medium is returned to an input port of the hydraulic motor 2 and from there via the work line 16, the work port B to the reservoir port T. As was mentioned at the outset, in the initial acceleration of the rotating mechanism 10 a high load pressure at first builds up at the rotating mechanism, which is reported to the pilot control stage 28 of the pressure control valve 4 via line 38. Due to this very high load pressure, the pilot control valve body is urged against its valve seat with a high force, so that the pressure control valve 4 is adjusted to a setting generally located above the LS pressure cut-off, whereby the maximum meter-in pressure to the hydraulic motor is restricted, so that this setting of the pressure control valves 4, 4' is not critical. With respect to the function of the LS pressure cut-off, reference is made to the existing prior art, for example DE 4220656A1, for the sake of simplicity.

By designing this higher setting as a pressure which is above the LS pressure cut-off, the power loss occurring during acceleration may be reduced to minimum.

What is more important for the function of the rotating mechanism is the setting of the pressure control valves 4, 4' which manifests upon deceleration of the rotating mechanism. For braking the rotating mechanism, the directional valve 12 is taken back from switching position a into switching position 0, so that ports P, T, A and B are blocked against each other. Owing to its mass inertia, the rotating mechanism 10 continues to rotate despite an interrupted supply of pressure medium, so that a braking pressure opposing the rotation will build up in the work line 16. This braking pressure may attain such a magnitude in the case of a small load of the excavator 8 that the rotating mechanism is braked abruptly, so that as a result of the occurring loads the rotating mechanism drive may be damaged, or on the other hand the load may assume an unstable condition. The braking pressure level in the work line 16 is predetermined by the setting of the pressure control valve 4' which is determined by the pressure in the cylinder 42. In the circuit according to the invention, a control pressure corresponding to the load of the excavator 8 is reported via the load reporting line 40 to the pilot control stage 28 of the pressure control valve. I.e., when the load on the excavator 8 is high, the pressure control valve is adjusted to a higher setting than with a low load of the excavator 8. In the variant represented in FIG. 2, the load pressure of the lifting cylinder 42 is reported to the pilot control stage 28 via the shuttle valve 36 as a measure for the mass moment of inertia of the rotating mechanism 10. Where this setting is exceeded, the main piston 22 of the pressure control valve 4 is controlled open, so that the pressure medium is conveyed from the work line 16 via the pressure control valve 4' and the connection line 26 to port S of the pressure control valve 4. Flow through the latter takes place in the opposite direction, so that the pressure medium is returned by the connection line 26 into the low-pressure region, i.e. into the work line 14. For the case that the pressure in the work line 14 drops to a minimum level, pressure medium may be replenished from the reservoir via suction port S.

Figure 5:
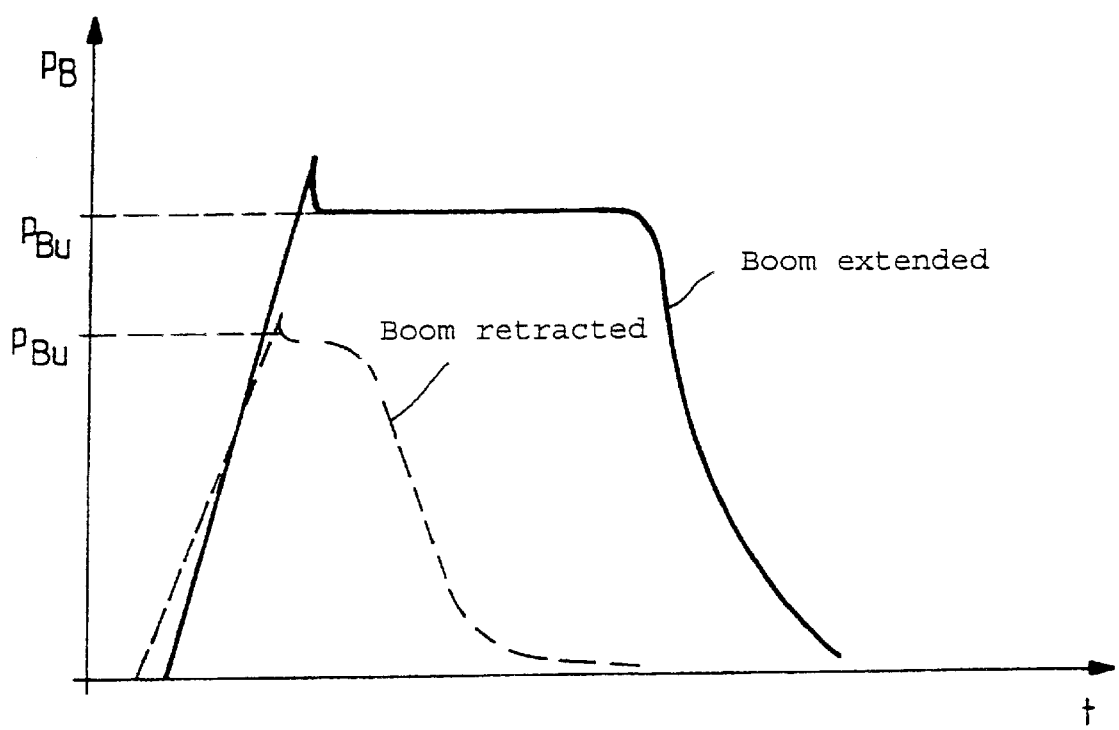
FIG. 5 is a diagram explaining the braking pressure development in accordance with time for various moments of inertia of a rotating mechanism.

By reporting a pilot load pressure corresponding to the load of the excavator 8 to the pilot control stage of the pressure control valves 4, 4', the setting of the latter may be adapted in a simple manner, so that the operational safety of the excavator 8 during braking the rotating mechanism 10 is ensured at any time. In FIG. 5 the braking pressure $P_B$ is represented over time at various boom positions. The continuous line represents an operating condition wherein the boom is fully extended or subject to a high load, while the interrupted line represents a retracted boom or a low load.

Accordingly, during braking the rotating mechanism, i.e. during adjustment of the directional valve 12 into its blocking position, the braking pressure $P_B$ initially increases until it reaches the setting $P_{Bu}$, so that the pressure control valve is taken into its control position wherein the braking pressure is restricted to this setting $P_{Bu}$. At a low mass moment of inertia, for example when the boom 44 is retracted, this setting $P_{Bu}$ is substantially lower than the corresponding value at a high mass moment of inertia (boom 44 extended), so that the rotating mechanism 10 is braked comparatively gently with a low braking pressure in the former case, while the maximum applicable braking pressure only acts in the case of a high load. This is predetermined by the pressure control valve (not represented) in the load reporting line 40 in the above described embodiment. Following deceleration of the rotating mechanism with the braking pressure corresponding to the setting $P_{Bu}$, the pressure in the work line 16 drops to a level below this setting, so that the pressure control valve 4' remains closed, and the rotating mechanism is decelerated until standstill.

Figure 4:
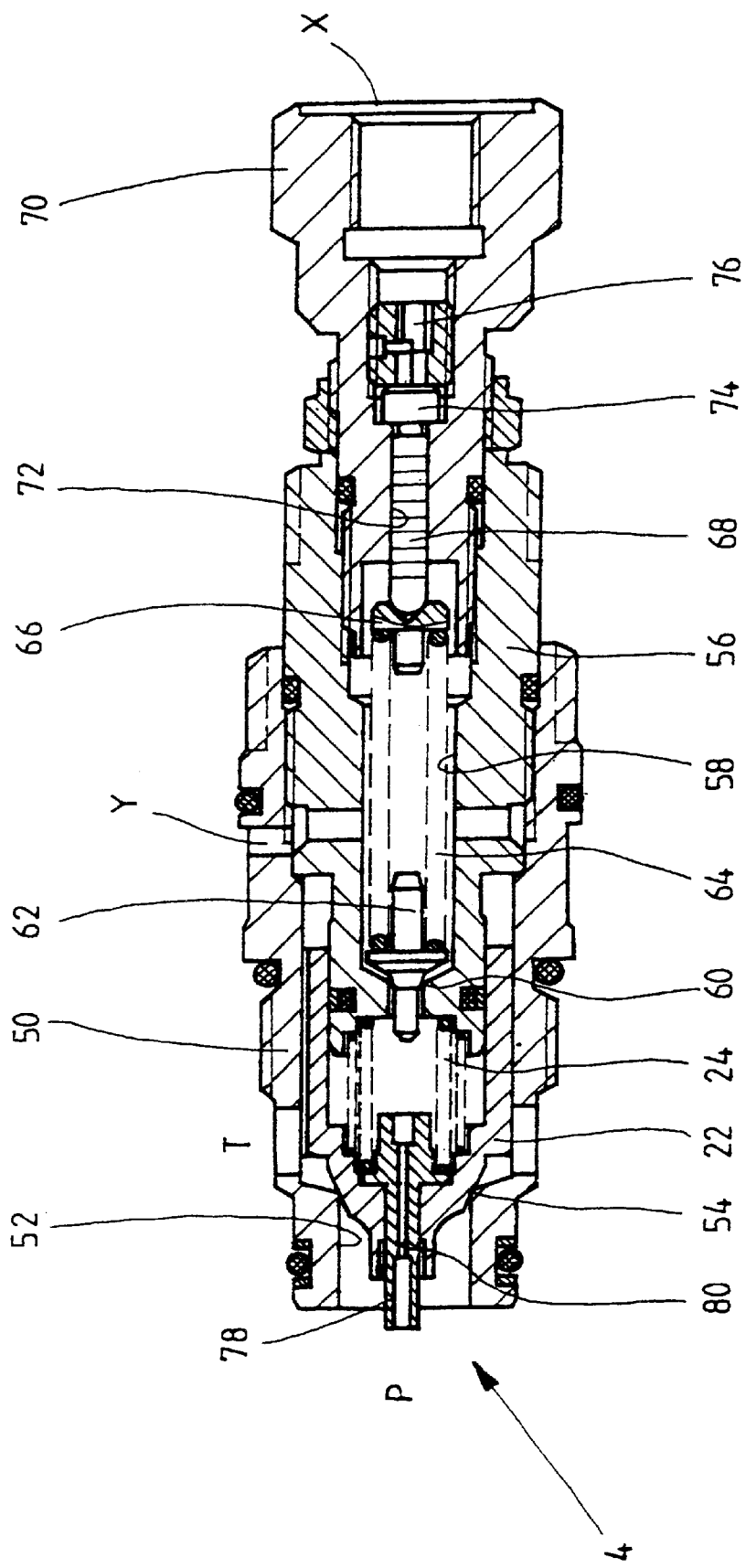
FIG. 4 is a sectional view of a pressure control valve for a circuit in accordance with FIG. 2.

In FIG. 4 an embodiment of a pressure control valve 4 is represented as it may be employed for a circuit in accordance with FIG. 2. The basic construction of a similar valve has already been described in previous application No. 197 44 337 to the same applicant, so that with respect to the specific design of the valve, reference is made to that disclosure for the sake of simplicity, and in the following only those components essential for comprehension shall be described.

The pressure control valve 4 is designed as a cartridge and includes a valve housing 50 having a valve bore 52 realized in it. The latter forms, through a radial shoulder, a valve seat 54 against which the main piston 22 is pre-stressed by the pressure spring 24. The latter is supported against an insert 56 screwed into the valve bore 52 and in turn provided with a pilot control valve bore 58. The latter is stepped back at its left-hand end portion in the representation of FIG. 4 towards a pilot control valve seat 60 against which a pilot control valve body 62 is pre-stressed through a pilot control spring 64. The latter is supported against a spring plate 66 which, in turn, contacts the front surface of a transformer piston 68. Into the right-hand end portion of the pilot control valve bore 58 in the representation of FIG. 4 a setscrew 70 is screwed in which a guide bore 72 is formed. The transformer piston 68 extends through this guide bore 72, so that the axial position of the spring plate 66 is variable as a function of the axial position of the transformer piston 68. The other end portion of the transformer piston 68 is provided with a stop collar 74 which contacts a radial shoulder of the guide bore 72 in the basic position represented in FIG. 4, so that the displacement of the transformer piston 68 towards the left (view of FIG. 4) is limited by the stop collar 74 contacting the radial shoulder of the guide bore 72.

The diameter of the transformer piston 68 is designed to be somewhat greater than the diameter of the valve seat 60, so that the pressure switch-on stage presents a transmitting ratio of i>1. In the shown embodiment, the transmitting ratio i of the pressure switch-on stage is realized to be 1.1:1. Depending on operating conditions it is, of course, possible to select other transmitting ratios.

The right-hand end position of the transformer piston 68 may be adjusted by means of a stop bolt 76 screwed into the guide bore 72, which the stop collar 74 contacts in its right-hand end position (view of FIG. 4). In the relative arrangement represented in FIG. 4, the transformer piston 68 is blocked for readjustment, so that no axial displacement is possible.

The settings of the pressure control valve 4 may be varied by changing the axial position of the setscrew 70 and of the stop bolt 76. To this end, the transformer piston 68 is initially blocked by turning in the stop bolt 76 to such an extent that the stop collar 74 is urged against the radial shoulder of the guide bore 72. This position is represented in FIG. 4.

The maximum pressure (upper setting) of the pressure control valve 4 is set by turning the setscrew 70 into the pilot control valve bore 58 to such an extent that the pilot control valve spring 64 is adjusted to a predetermined bias. This bias may not be increased by means of the transformer piston 68 as the latter already has been taken into its left-hand stop position.

The minimum pressure (lower setting) is adjusted by turning out the stop bolt 76 from its represented end position, so that the bias of the pilot control valve spring 64 is reduced to a minimum which manifests when the pressure at the pilot control port x approaches 0. By correspondingly applying a pilot control pressure to the pilot control port X, it is then possible to vary the bias of the pilot control valve spring 64 between the two above mentioned limits and thus to adjust the braking pressure $P_B$ in accordance with the load of the excavator 8.

At the right-hand end portion of the guide bore 72 in the representation of FIG. 4, the pilot control port X is formed. The control port Y has the form of a radial port which extends through the peripheral walls of the valve housing 50 and of the insert 56 in the radial direction and opens into the spring cavity for the pilot control valve spring 64. The pump port P is formed at the left-hand front side of the valve housing 50, while the lowp-ressure or reservoir port T opens into the valve bore 52 as a radial port downstream from the valve seat 54.

The main piston 22 has in its bottom an axial bore for receiving a nozzle body 78, through the throttle bore of which pressure medium may enter from the pump port P into the spring cavity of the main piston 22.

In the represented basic position, the pilot control valve body 62 rests on the pilot control valve seat 60, so that the main piston 22 is pre-stressed against its valve seat 54 by the force of the pressure spring 24 and the pressure reported into the spring cavity via the throttle bore 80. When a predetermined pressure in this spring cavity is exceeded, the pilot control valve body 62 is raised from its pilot control valve seat 60 against the force of the pilot control valve spring 64, so that the pressure medium may flow off from the spring cavity of the main piston 22 into the spring cavity of the pilot control valve spring 64 and from there via the radial bores to control port Y. Hereby the pressure acting on the main piston 22 in the closing direction is diminished, so that the main piston 22 rises from its valve seat 54 and is moved into its control position for limiting the maximum pressure at the pump port P.

Adjustment of this maximum pressure is thus carried out in dependence on the force acting on the pilot control valve body 62 in the closing direction. In the embodiment represented in FIG. 4, these forces acting in the closing direction may be varied by changing the bias of the pilot control valve spring 64. In the shown embodiment, this is achieved in that the pressure present in the load reporting line 40 is reported via the pilot control port X to the back side (front surface of the stop collar 74) of the transformer piston 68. In order to enable this, the stop bolt 76 is provided with an axial bore through which the control pressure is conveyed to the adjacent front surface of the transformer piston 68.

In the above described embodiment the pilot control pressure acts indirectly on the spring plate 66 to change the bias of the pilot control valve spring 64. As an alternative for this variant, the pilot control pressure might equally be reported directly to the back side of the pilot control valve body 62, so that the latter is urged against the pilot control valve seat 60 by the force of the pilot control valve spring 64 and the pressure force resulting from the pilot control pressure.

The applicant reserves the right of directing a separate application or a separate set of claims to the structure of the pressure control valve 4 with application of an external pilot control pressure X to be applied on the pilot control valve body 62.

What is disclosed is a hydraulic circuit for controlis ling a consumer of a mobile work tool, wherein the pressure in supply and outlet lines towards the consumer is limited by means of pilot-controlled pressure control valves. The pilot control stage of these pressure control valves may be adjusted in accordance with a pilot control pressure corresponding to the load of the work tool.

What is claimed is:

1. Hydraulic circuit for controlling a consumer (2) of a work tool (8), including a pump (1) for supplying the consumer (2), via a supply line (14, 16), with pressure medium which may be returned to a reservoir (T) through a return line (14, 16), with a respective pilot-controlled pressure control valve (4, 4') being arranged in said supply and return lines (14, 16) so that it is possible to carry off the pressure medium when a limit pressure in a low-pressure region is exceeded, characterized by a braking pressure reporting line (34) through which a pilot control valve body (62) of said pressure control valves (4, 4') may directly or indirectly receive application of a pilot load pressure corresponding to the load of the work tool (8); and wherein said consumer is a hydraulic motor (2) of a rotating mechanism (10), and that the pilot load pressure is tapped at a lifting cylinder (42) of a boom (44) of a mobile work tool (8).

2. Hydraulic circuit in accordance with claim 1, characterized in that said braking pressure reporting line (34) branches from the output of a shuttle valve (36), at the inputs of which the load pressure of the consumer (2) on the one hand and the pilot load pressure on the other hand are present.

3. Hydraulic circuit in accordance with any one of claim 2, characterized in that the pilot load pressure acts directly on said pilot control valve body (62) in the closing direction.

4. Hydraulic circuit in accordance with claim 1, characterized in that the pilot load pressure acts on a transformer piston (68) against which a pilot control valve spring (64) for said pilot control valve body (62) is supported.

5. Hydraulic circuit in accordance with claim 4, characterized in that said transformer piston (68) has a greater diameter than said pilot control valve seat (60).

6. Hydraulic circuit in accordance with claim 1, characterized in that the pilot load pressure acts directly on said pilot control valve body (62) in the closing direction.

7. Hydraulic circuit in accordance with claim 1, characterized in that each pressure control valve (4, 4') is an anti-cavitation valve through which the pressure medium may be replenished in said supply line (14, 16) in the case of a pressure build-up in said return line (14, 16).

8. Hydraulic circuit in accordance with claim 1, characterized in that between said pump 1 and said pressure control valve (4, 4') a directional control valve (12) comprising a directional component is arranged, and that the pilot load pressure is reported to the pilot control stages (28) of both pressure control valves (4, 4').

9. Hydraulic circuit in accordance with claim 1, characterized in that a pressure control valve for limiting the pilot load pressure is arranged in a load reporting line (40).

10. Hydraulic circuit in accordance with claim 1, characterized in that said braking pressure reporting line (34) branches from the output of a shuttle valve (36), at the inputs of which the load pressure of the consumer (2) on the one hand and the pilot load pressure on the other hand are present.

11. Hydraulic circuit in accordance with claim 1, characterized in that the pilot load pressure acts directly on said pilot control valve body (62) in the closing direction.

* * * * *